G. E. ROBERTSON.
MEANS FOR OPERATING SHIPS' LOGS.
APPLICATION FILED MAY 29, 1913.
1,230,225.
Patented June 19, 1917.
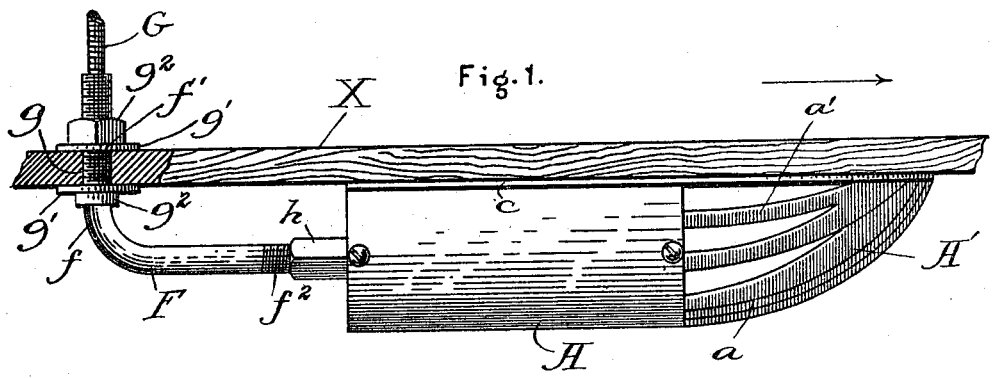
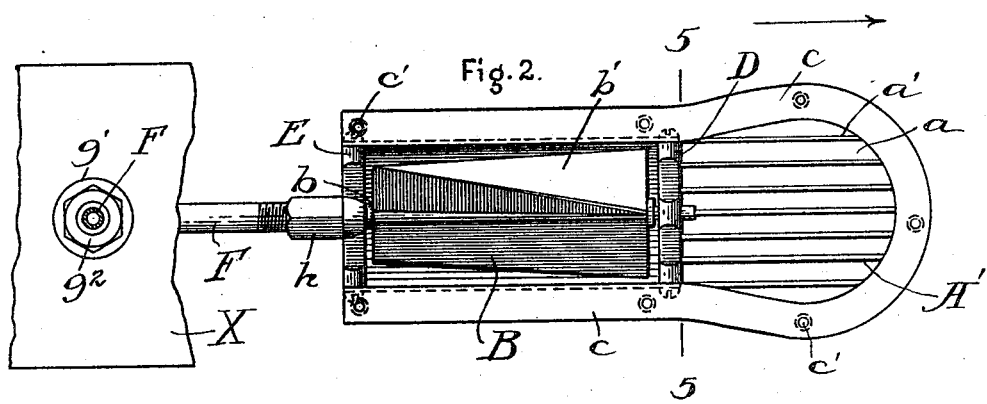
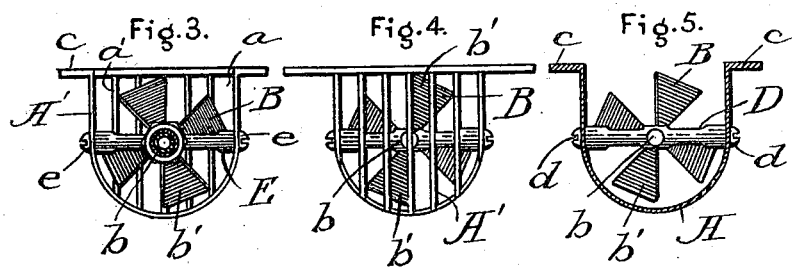
WITNESSES:
Fred'h S. Robertson
Fred'k W. Gore.
INVENTOR
George E. Robertson
BY
Griffins Bernhard
ATTORNEYS

UNITED STATES PATENT OFFICE.

GEORGE E. ROBERTSON, OF HUNTINGTON, NEW YORK.

MEANS FOR OPERATING SHIPS' LOGS.

1,230,225.  Specification of Letters Patent.  Patented June 19, 1917.

Application filed May 29, 1913. Serial No. 770,566.

*To all whom it may concern:*

Be it known that I, GEORGE E. ROBERTSON, a citizen of the United States, residing at Huntington, county of Suffolk, and State of New York, have invented a certain new and useful Means for Operating Ships' Logs, of which the following is a specification.

This invention is a means for operating instruments employed on marine vessels for measuring the course and indicating the speed, such instruments being commonly known as ships' logs.

The object of the invention is to prevent weeds and other marine growths from interfering with the free operation of that part of the mechanism which is submerged in the water exteriorly to the craft; and, further, to enable the device to be readily and firmly secured in an operative position upon the exterior of the craft.

With these, and other, objects in view, the invention embodies a casing provided at its forward part with a grating through which water is free to flow when the craft is in motion, said casing operating primarily to exclude weeds, and other foreign matter, from the casing so as to prevent such matter from interfering with the operation of that part of the mechanism by which motion is imparted to the measuring or indicating instrument.

Within the casing is positioned a rotatable member, sometimes termed a fly, to which motion is imparted by the flow of water through the casing when the craft is moving, and to the axle or shaft of this rotatable member is connected a flexible transmission shaft, the latter extending through a tubular incasing member, whereby weeds and floating debris cannot become entangled with said flexible shaft.

It is preferred to couple the tubular incasing member to a part of the casing at the rear thereof and to the planking of the boat by means which enable said casing to be readily disconnected and applied as may be desired.

Furthermore, the casing and the grating are formed with means for fixedly securing the same in position, and, further, the axle of the rotatable member is supported in bearings on transverse castings, the latter being removably secured within the imperforate casing.

Other features of the invention, and the advantages thereof, will be pointed out in the following detailed description.

In the drawings:—

Figure 1 is a side elevation of the device applied to the under side of a boat, the planking of which is partly broken away and in section.

Fig. 2 is a plan view of the device showing a portion of the boat planking broken away.

Fig. 3 is an end elevation looking at the open rear end of the casing and showing the rear portion of a rotary member.

Fig. 4 is a front elevation looking at the grated end of the casing.

Fig. 5 is a cross section on the line 5—5 of Fig. 2.

A designates a casing within which is arranged a rotatable member B adapted to be driven by the flow of water through the casing when the craft is in motion, said rotatable member being operably connected with a measuring or indicating instrument (not shown) adapted to be contained within the boat.

The casing shown in the drawings consists of an imperforate shell substantially U-shaped in cross section, as shown in Fig. 5. The forward part of this casing is provided with a series of longitudinal slots $a$, thus producing a series of members $a'$, the same forming a slatted or grated member A' at forward end of casing A. This grated member A' of the casing is curved upwardly and forwardly of the imperforate section or portion of the casing; and around the top edge of the imperforate section, and the grated member extends a continuous flange $c$, the latter being at an angle to the casing and its grated member, so that the casing and the grated member may be positioned upon the bottom or side portion of a marine craft, the planking of which is indicated at X in Figs. 1 and 2. The casing is fastened firmly to the craft by any suitable means, such as screws or bolts adapted to pass through the openings $c'$ provided in marginal flange $c$. The bolts or screws are intended to be embedded in the planking of the craft so that the heads of said bolts or screws will be countersunk in openings $c'$, whereby the casing is secured in a fixed position upon the craft exteriorly thereto. Obviously, the casing may be applied easily and quickly to any craft, and it can be disconnected should it be found necessary or desirable to obtain access to the parts housed or contained within said casing.

The casing is open at its rear end, and when the craft is in motion water is free to enter through the slots $a$ in the grated section A' of said casing, the water flowing freely into and through the chamber of the imperforate section of casing A and making its exit through the open rear end of said casing without appreciable obstruction.

Within the imperforate section of casing A are positioned transverse castings D E, each casting being in the form of a straight horizontal bar adapted to be secured in position by suitable screws. Casting D is positioned within the forward part of the casing, just in rear of the grated section A' thereof, and said casting is secured detachably in position by screws $d$ which pass through the casing and are received in suitable openings provided in the end portions of the casting. The other casting E is at the rear open end of the casing, and it is secured fixedly in position by screws $e$. As shown, the castings D E are at the respective ends of the imperforate section of the casing, and these castings are provided with suitable bearings adapted to support the axle or shaft $b$ of the rotatable member B.

The rotatable member B extends longitudinally of the imperforate section of casing A, the respective end portions of the axle or shaft $b$ of the rotatable member being journaled in the bearings of the castings D E. The rotatable member consists of shaft $b$ and a series of inclined vanes or wings $b'$, said vanes or wings extending longitudinally of the shaft and attached in a suitable way thereto. The rotatable member is housed or incased within the imperforate section of casing A so as to be protected thereby from entanglement with weeds and other floating debris, but when the craft is in motion water flows freely through the casing in the manner described so as to act upon the wings of the rotatable member, whereby rotary motion is imparted to the member B, the speed of rotation of which is dependent upon the speed of the craft and the flow of water through the casing.

F designates a tubular incasing member positioned exteriorly to the vessel and having a bent end $f$ which is exteriorly threaded at $f'$, the other end of said incasing member F being exteriorly threaded at $f^2$. The bent end of the casing member passes through an opening $g$ provided in the bottom or side of the planking X, and on this threaded end $f'$ are fitted the washers $g'$ and nuts $g^2$, whereby the bent end of the incasing member is attached fixedly to the hull of the craft. The other threaded end $f^2$ of the tubular incasing member receives a coupling $h$ which is fastened to the hub portion of transverse casting E, and thus the tubular member F is rigidly connected at its respective ends to casing A and the craft. Through the tubular incasing member passes a flexible shaft G, the lower forward end of which is coupled in a suitable way to the axle or shaft $b$ of the rotatable member B. This flexible shaft extends through the tubular incasing member and the hull of the craft so that the shaft G is free to rotate within the tubular incasing member for the purpose of transmitting the motion of rotatable member B to a suitable instrument carried within the craft and operating to measure the course or indicate the speed of the craft.

The operation of the invention will be apparent from the description taken in connection with the drawings. The device is easily and quickly applied, and it is retained firmly in position. When the craft is in motion in the direction indicated by the arrow in Figs. 1 and 2, the casing and the several parts are carried through the water by the motion of the craft, the water being free to enter the interior of the imperforate section of the casing through the grated section A', the latter acting primarily to prevent weeds and other debris from passing into contact with the rotary member B. The action of the water upon the inclined wings $b'$ imparts rotary motion to member B and this motion is transmitted by flexible shaft G to the instrument, said flexible shaft being incased within tubular member F so that weeds and other matter cannot become entangled therewith.

Having thus fully described the invention, what I claim as new, and desire to secure by Letters Patent is:

1. In a device of the class described, the combination of an imperforate casing the forward part of which is provided with a weed-excluding grating, a tubular incasing member extending rearwardly from said imperforate casing, said tubular incasing member being provided with an elbow, means for fixedly attaching the elbow to a boat, means for connecting said tubular incasing member to said casing, a rotator supported within said imperforate casing, and a flexible shaft extending loosely through the tubular incasing member and the elbow thereof, said flexible shaft being operated by the rotator.

2. In a device of the class described, an imperforate casing substantially U-shaped in cross section and provided at the forward portion with a weed-excluding grating, said casing and the grating being provided with a marginal attaching flange, in combination with supporting bearings fixedly secured within the imperforate casing, a rotator the shaft of which is journaled in said bearings, a tubular incasing member provided at its rear with a threaded elbow, means for fixedly attaching said elbow to a boat, means for coupling the tubular incasing member to one of said bearings, and a flexible shaft
5 extending through the incasing member and the elbow thereof, said flexible shaft being driven by the rotator shaft.

In testimony whereof I have signed my name to this specification in the presence of two subscribing witnesses.

GEORGE E. ROBERTSON.

Witnesses:
FREDERICK W. GORE,
JESSE G. CORWIN.

Copies of this patent may be obtained for five cents each, by addressing the "Commissioner of Patents, Washington, D. C."